UNITED STATES PATENT OFFICE 2,361,220

MOLDED ELECTRICALLY CONDUCTIVE BODY

Homer J. Loftis, Ironton, Ohio, assignor to Henrite Products Corporation, Ironton, Ohio, a corporation of Ohio No Drawing. Application November 15, 1941,
Serial No. 419,293

4 Claims. (Cl. 171—325)

This invention relates to improvements in molded electrically conductive bodies suitable for commutator brushes for electric motors, generators and like electrical apparatus, and for other purposes.

Molded electrically conductive bodies comprising a resinoid or pitch bonded graphite composition or a resinoid or pitch bonded metal-graphite composition have long been known and, in general, have given satisfactory service. Such molded bodies, especially when employed as commutator brushes, are subject to comparatively rapid wear in use, particularly when operating under low humidity atmospheric conditions. For example, motors and generators for use in aircraft require commutator brushes of low resistance material adapted to function at low voltage and with low contact drop between the brush and commutator; which characteristics are provided by molded bodies of a bonded graphite composition. It has been found, however, that operating conditions to which aircraft motors and generators are subjected differ considerably from those to which similar motors and generators are subjected when operated at earth surface. Aircraft motors and generators are subjected to considerable vibration, and frequently, for long periods, to low humidity atmospheric conditions, such as prevail in high altitudes, which on the one hand, greatly increase the physical stresses and strains to which their commutator brushes are subjected, and, on the other hand, causes said brush bodies to quickly dry out in the relatively dry rarified atmosphere, so that the brush rapidly wears away under such conditions; in many cases its useful life being reduced to but a few hours.

Having these things in view, it is an object of this invention to provide a molded electrically conductive body of novel composition whereby the same is strengthened and hardened to increase its physical resistance to wear, and whereby the same is given an affinity for moisture, so that, being capable of absorbing and retaining moisture, its tendency to rapidly dry out and become friable is substantially checked, and consequently its period of useful life is considerably prolonged; while at the same time the presence of its moisture content produces a lubricating effect which, when the body serves as a commutator brush, provides smoother and more efficient contact thereof with the commutator surface.

According to this invention the electrically conductive body, e. g. a commutator brush body, is molded from a composition of good electrically conductive material such as graphite, or graphite mixed with a pulverulent metal such as copper powder, and a bonding material comprising a synthetic resin or resinoid substance, such e. g. as "Bakelite," or pitch. To a molding composition of such character is added a certain percentage of an alkaline earth metal salt having hygroscopic properties, and having melting points not under 900 degrees F. or boiling points not under 1750 degrees F. The addition of a hygroscopic earth metal salt of the character specified has two effects upon the molded body or brush in which it is incorporated, (1) it modifies the bond so as to strengthen and harden the composition as a whole with the effect of increasing the physical resistance thereof to wear, and (2) due to the hygroscopic property of the salt, it imparts to the composition an affinity for moisture with the effect of increasing the resistance thereof to drying out and becoming friable, while at the same time the absorbed and retained moisture produces a lubricating effect upon the meeting surfaces of a brush body and commutator to which it is applied.

Examples of earth metal salts having the desired hygroscopic properties, and coming within the melting point or boiling point limits above mentioned are herebelow tabulated.

|  | Melting point | Boiling point |
|---|---|---|
|  | °F. | °F. |
| Calcium chloride |  | 2,912 |
| Lithium bromide |  | 2,309 |
| Lithium chloride |  | 2,470 |
| Magnesium bromide |  |  |
| Magnesium chloride | 1,292 |  |
| Potassium bromide |  | 2,572 |
| Potassium carbonate |  | 2,516 |
| Potassium fluoride |  | 2,750 |
| Potassium hydroxide |  | 2,732 |
| Potassium molybdate |  | 2,408 |
| Potassium ortho-phosphate | 1,687 |  |
| Sodium bromide | 2,444 |  |
| Sodium chloride |  | 2,534 |
| Sodium carbonate |  | 2,577 |
| Sodium cyanide | 1,563 |  |
| Sodium hydroxide |  | 2,724 |
| Strontium bromide |  | 2,535 |
|  | 1,166 |  |

Calcium chloride is the preferred salt, since it not only has high strengthening or hardening effect upon the composition, as well as high affinity for moisture, but in addition appears to provide a superior lubricating effect, and renders a molded commutator brush containing the same noticeably quieter in operation. Sodium chloride is also quite satisfactory in both strengthening effect, and in moisture affinity effect.

In making up the molding composition, the bond and conductive material mix is taken as 100 per cent, and the amount of salt to be added is calculated as a percentage of the bond. For example, if the base composition comprises 60 per cent conductive material and 40 per cent bond, the salt will be added in an amount which is a certain percentage of the bond, for instance 10% of the bond, so that the formula would be as follows:

| | Parts |
|---|---|
| Conductive material | 60 |
| Bonding material, either pitch, a resinoid material or the like | 40 |
| Salt | 4 |

Since, however, the ratio of salt to bonding material varies with different specific salts and according to ultimate brush body characteristics desired to be obtained, such as degree of hardness or degree of moisture, the percentage range for added salt may run from 2½ per cent to 50 per cent of the bonding material; although for bonded graphite brushes with which calcium chloride, as the selected salt, is incorporated to provide the hygroscopic and hardening agent, the quantity of the latter preferably falls within a range of 2½ to 15 per cent of the bond, an amount approximating 5 per cent of the bond appearing to be most satisfactory; if sodium chloride is used as the selected salt to provide the hygroscopic and hardening effect, the same general range is preferable, but an amount thereof approximating 10 per cent of the bond appears to be the most satisfactory. Some account must be taken as to the conditions to which the brush will be subjected in use, for a too great salt content may tend to make the brush too moist if it is to be subjected in use to atmospheric conditions of comparatively high humidity.

The compositions with the added salt are suitably molded to shape in manner and by means well known in the art, and the resultant molded bodies are baked at comparatively high temperatures ranging up to 1700 degrees F.; at which latter temperature the calcium chloride e. g. will become desirably calcined.

The following examples are illustrative of the invention as applied to furnish molding compositions suitable for molding commutator brush bodies having the desired wear resisting and moisture affinity characteristics:

Example I

| | |
|---|---|
| Resinoid bond | 14 parts |
| Graphite | 86 parts |
| Calcium chloride | .07 part or 5% of bond |

Example II

| | |
|---|---|
| Resinoid bond | 40 parts |
| Graphite | 60 parts |
| Sodium chloride | 4 parts or 10% of bond |

Example III

| | |
|---|---|
| Resinoid bond | 6 parts |
| Metal powder | 58 parts |
| Graphite | 36 parts |
| Sodium chloride | 0.6 part or 10% of bond |

Commutator brushes produced from molding compositions above described are found to possess, among others, the following advantageous characteristics:

(1) Comparatively long life
(2) Superior commutating qualities
(3) Lubricating qualities due to absorption and retention of moisture
(4) Low electrical resistance
(5) Low contact drop
(6) Strong physical structure Having described my invention, I claim:

1. A molded and baked commutator brush comprising a resinoid bonded electrically conductive material wherein the resinoid bond constitutes from 6 to 40 per cent thereof, with which is incorporated an alkaline earth metal salt content, the quantity of said salt being in a proportion ranging from 2½ to 50 per cent of the amount of resinoid bond.

2. A molded and baked commutator brush comprising a resinoid bonded graphite wherein the resinoid bond constitutes from 6 to 40 per cent thereof, to which is added an alkaline earth metal salt from the class consisting of the chlorides, the quantity of said salt being in a proportion ranging from 2½ to 15 per cent of the amount of resinoid bond.

3. A molded and baked commutator brush comprising a resinoid bonded graphite wherein the resinoid bond constitutes approximately 15 per cent thereof, to which is added calcium chloride, the amount of the latter being in a proportion approximating 5 per cent of the amount of resinoid bond.

4. A molded and baked commutator brush comprising a resinoid bonded graphite wherein the resinoid bond constitutes approximately 40 per cent thereof, to which is added sodium chloride, the amount of the latter being in a proportion approximating 10 per cent of the amount of resinoid bond.

HOMER J. LOFTIS.